United States Patent [19]

Jacoby

[11] Patent Number: 5,755,142
[45] Date of Patent: May 26, 1998

[54] STEERING MECHANISM

[76] Inventor: Byron H. Jacoby, 5299 Cynthis La., Dayton, Ohio 45429

[21] Appl. No.: 690,639

[22] Filed: Jul. 30, 1996

[51] Int. Cl.$^6$ .................................................. B62D 1/10
[52] U.S. Cl. ....................... 74/552; 74/557; 74/492; 280/778
[58] Field of Search ........................ 74/552, 492, 493, 74/557, 558, 558.5; 280/775, 778, 779; D12/175, 176, 177

[56] References Cited

U.S. PATENT DOCUMENTS

| D. 112,909 | 1/1939 | Kathe. | |
|---|---|---|---|
| D. 149,444 | 4/1948 | Rose | 14/30 |
| D. 172,106 | 5/1954 | O'Connor et al. | 66/2 |
| D. 207,002 | 2/1967 | LeRose | D12/175 |
| 1,251,313 | 12/1917 | White | 74/558.5 X |
| 1,677,082 | 7/1928 | Heckman. | |
| 1,714,155 | 5/1929 | Binkley. | |
| 2,168,961 | 8/1939 | Ragan | 74/557 |
| 2,206,431 | 7/1940 | Schoenbechler | 74/552 |
| 2,274,069 | 2/1942 | Johnson | 74/557 |
| 2,305,527 | 12/1942 | Hassett | 74/557 |
| 3,196,709 | 7/1965 | Bickford | 74/557 |
| 3,282,124 | 11/1966 | Peterson | 74/552 X |
| 3,983,952 | 10/1976 | McKee | 280/778 |
| 5,136,895 | 8/1992 | Ocard et al. | 74/552 |

FOREIGN PATENT DOCUMENTS 122865  6/1987  Japan .................................. 74/552

Primary Examiner—Charles A. Marmor
Assistant Examiner—Mary Ann Battista
Attorney, Agent, or Firm—Robert William Graham

[57] ABSTRACT

A steering mechanism for a vehicle having a steering shaft includes an elongated crank having a first end operably fixedly connected to an end of the steering shaft and a steering plate rotatably connected to a second end of the elongated crank and having a pair of laterally displaced handles connected thereto, such that the steering plate is rotatable about the steering shaft and may further include at least one idler crank having a first end rotatably connected to a portion of the vehicle and a second end rotatably connected to the steering plate.

4 Claims, 4 Drawing Sheets

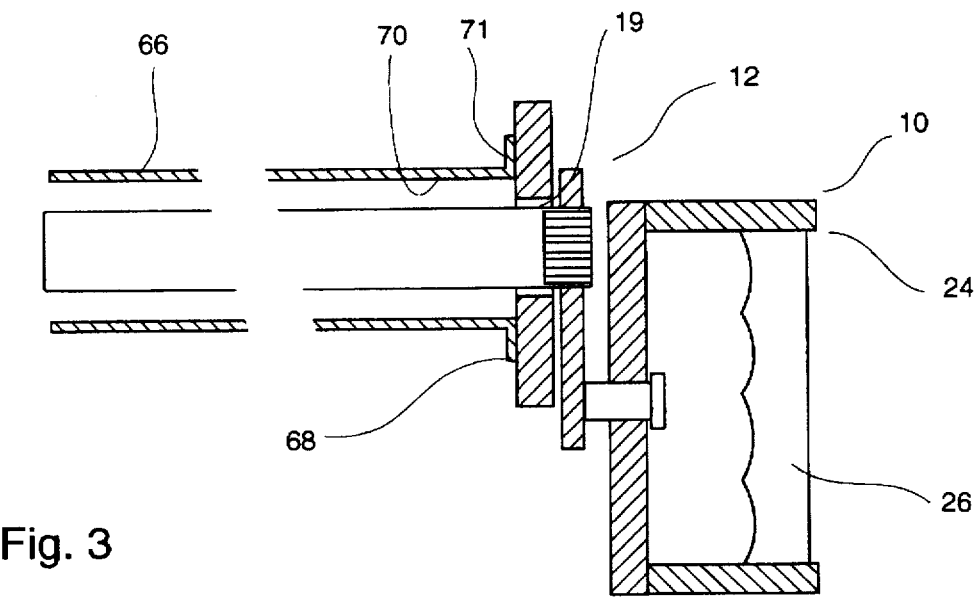
Fig. 3
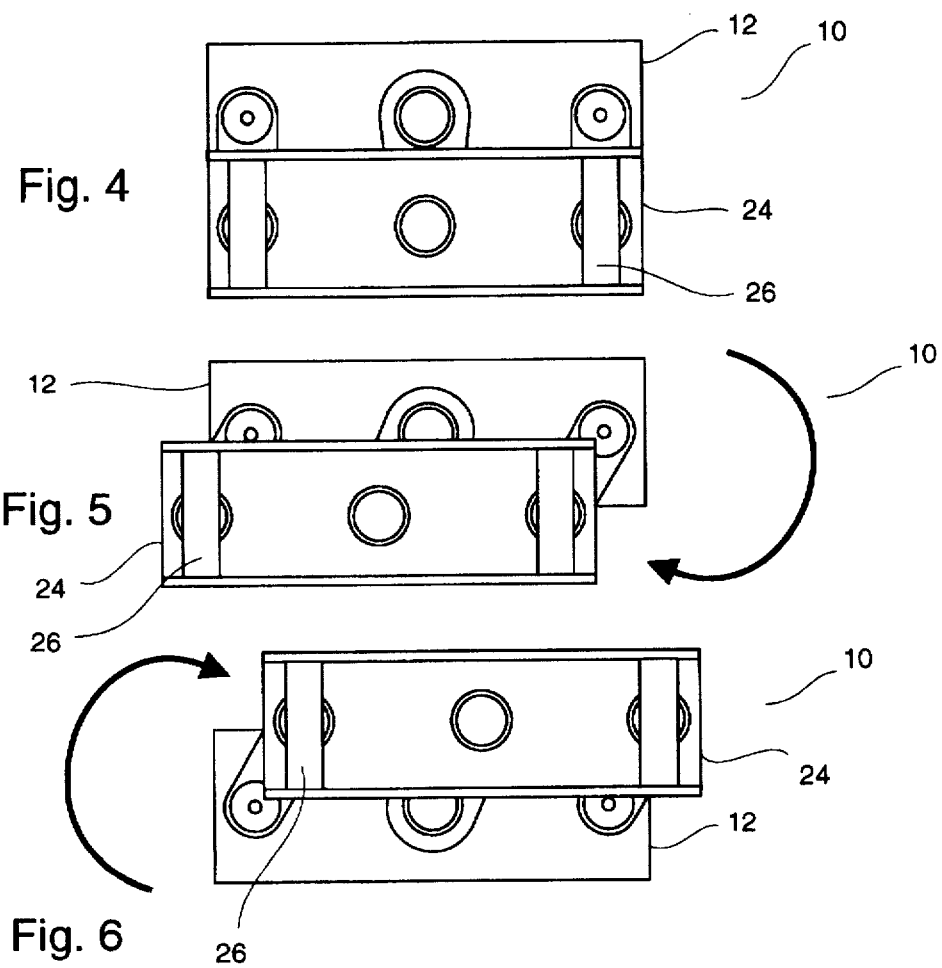
Fig. 4
Fig. 5
Fig. 6

STEERING MECHANISM

BACKGROUND OF THE INVENTION

FIELD OF THE INVENTION

The present invention relates to a steering mechanism for vehicles. More particularly, but not by way of limitation, the invention relates to a steering mechanism which enables an operator to steer a vehicle with either or both hands continuously grasped to a steering handle of the steering mechanism and in a manner which requires a relatively minimum amount of force and actuation to effectively turn the vehicle.

There have been many attempts to improve steering mechanisms. Such improvements have typically been a function of the particular steering mechanism application, i.e., for a plane or automobile, for example. Consequently, some steering mechanisms employ longitudinally displaced handle grips while others employ a conventional wheel configuration.

Each steering mechanism usually connects to a centrally located steering shaft with its handle or wheel operably radially displaced from the steering shaft such that when the operator grasps the handle or wheel and effects a turning of the steering shaft, the operator's hands are commonly caused to release prior to a complete rotation of the steering shaft a turning of the vehicle. This is due in part to the fact that the size of the wheel or displacement of the handle grips must not be so great as to be impractical to the user.

Accordingly, there is a need to improve steering mechanisms such that when the operator is centrally positioned adjacent the steering mechanism he or she can with minimal effort yet increased comfort and safety effectively turn the steering shaft through a complete rotation without the need to remove his or her hands from therefrom.

BRIEF SUMMARY OF THE INVENTION

It is an object to improve steering mechanisms.

It is another object to ease steering of a vehicle.

It is yet another object to increase safety of vehicle operation.

Accordingly, the present invention is directed to a steering mechanism for a vehicle having a steering shaft, which includes an elongated crank having a first end operably fixedly connected to an end of the steering shaft and a steering plate rotatably connected to a second end of the elongated crank and having a pair of laterally displaced handles connected thereto such that the steering plate is rotatable about the steering shaft. The steering mechanism further includes at least one idler crank having a first end rotatably connected to a portion of the vehicle and a second end rotatably connected to the steering plate.

Other objects and advantages will be readily apparent to those skilled in the art upon viewing the drawings and reading the detailed description hereafter.

BRIEF DESCRIPTION OF THE DRAWINGS

FIG. 3 is side cross sectional view of the present invention attached to a steering shaft.

FIG. 4 is a front view of the present invention in a first position of a rotation of the steering mechanism.

FIG. 5 is a front view of the present invention in a second position of a rotation of the steering mechanism.

FIG. 6 is a front view of the present invention in a third position of a rotation of the steering mechanism.

DETAILED DESCRIPTION OF THE INVENTION

Figure 1:
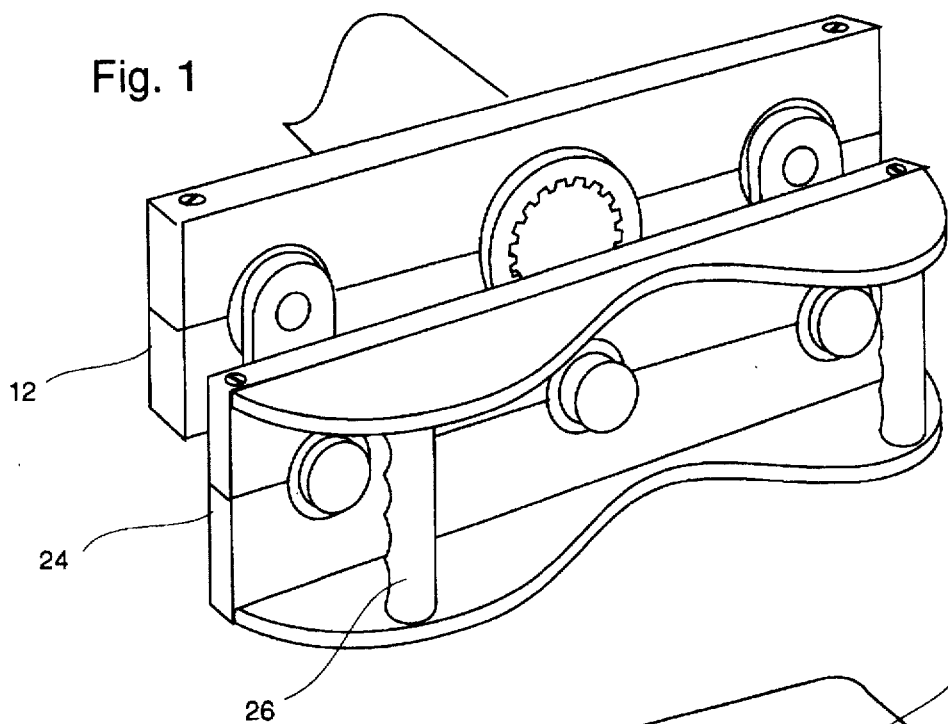
FIG. 1 is a perspective view of the present invention.

Referring to the drawings, the steering mechanism of the present invention is generally referred to by the numeral 10. The steering mechanism 10 includes a mounting plate 12, bearings 14, 16 and 18, splined shaft 19, steering crank 20, idler cranks 22, steering plate 24 with handle grips 26.

The mounting plate 12 can be of any suitable structure, preferably of a rigid material and of a configuration to fit within and onto a vehicle dashboard by means readily known to those skilled in the art. As shown, the mounting plate 12 includes two members 12a and 12b each of which has coaxial threaded surfaces 28a and 28b, wherein the threaded surfaces 28a and 28b extend through member 12a and 12b. Screws 30 thread to the threaded surfaces 28a and 28b to join the members 12a and 12b. The members 12a and 12b have oppositely disposed bearing surfaces 32a and 32b and 33a and 33b of a configuration to operably receive the bearings 14 and splined shaft 19, respectively.

The idler cranks 22 have a cylindrical member 34 which is configured to be rotatably disposed within generally cylindrical bearing surface 36 of the bearing 14, which in turn is rotatably disposed within the bearing surface 32. Fixably removable end caps 38 are connected to the first end to aid in retaining the cylindrical member 34 within the bearing 14. An elongated intermediate member 40 is connected to the cylindrical member 34 which together with end cap 38 cooperate to retain the cylindrical member 34 within the bearing 14. Cylindrical members 42 are connected to the intermediate members 40 and configured to be rotatably disposed within generally cylindrical bearing surfaces 44 of bearings 16.

The splined shaft 19 is of a generally cylindrical configuration to be rotatably received within generally cylindrical bearing surface 33 and has a series of recessed channels 46 in the outer surface thereof. The splined shaft 19 is of such a length to have its ends extend outside of the mounting plate 12 when positioned within the bearing surface 33.

The steering crank 20 has an elongated member 48 which includes an open surface 50 of a size and configuration to slidably receive the splined shaft 19 therein. Cylindrical members 52 are connected to the elongated member 50 and configured to be rotatably disposed within generally cylindrical bearing surface 54 of bearing 18.

The steering plate 24 is likewise of a suitable material as the mounting plate 12 and configuration to fit within and onto a vehicle dashboard by means readily known to those skilled in the art. As shown, the steering plate 24 includes two members 24a and 24b each of which has coaxial threaded surfaces 56a and 56b, wherein the threaded surfaces 56a extend through member 24a. Screws 58 thread to the threaded surfaces 56a and 56b to join the members 24a and 24b. The members 24a and 24b have oppositely disposed bearing surfaces 60a and 60b and 62a and 62b of a configuration to operably receive the bearings 16 and bearing 18, respectively. Flanged members 64a and 64b are connected to members 24a and 24b, respectively, and extend in a common direction to provide a connecting surface for handles 26. It is contemplated by the inventor that various instrument control panel devices can be integrated into the handles 26, such as speed control, clock, radio, phone, air conditioning, etc.

As seen in FIG. 3, there is shown a cross section of the steering mechanism of present invention connected to a steering column 66. The steering column 66 has an end 68 likewise configured with an open surface 70 to movably receive the splined shaft 19 therein and a flange 71 for rigid connection to the mounting plate 12. When connected, the steering crank 20 and steering shaft 19 are in a fixed relation.

FIGS. 4-6 illustrate the rotational operation of the steering plate 24 with respect to the mounting plate 12. As the steering plate 24 is clockwise rotated, the steering shaft is likewise rotated to effect a turn.

Figure 7:
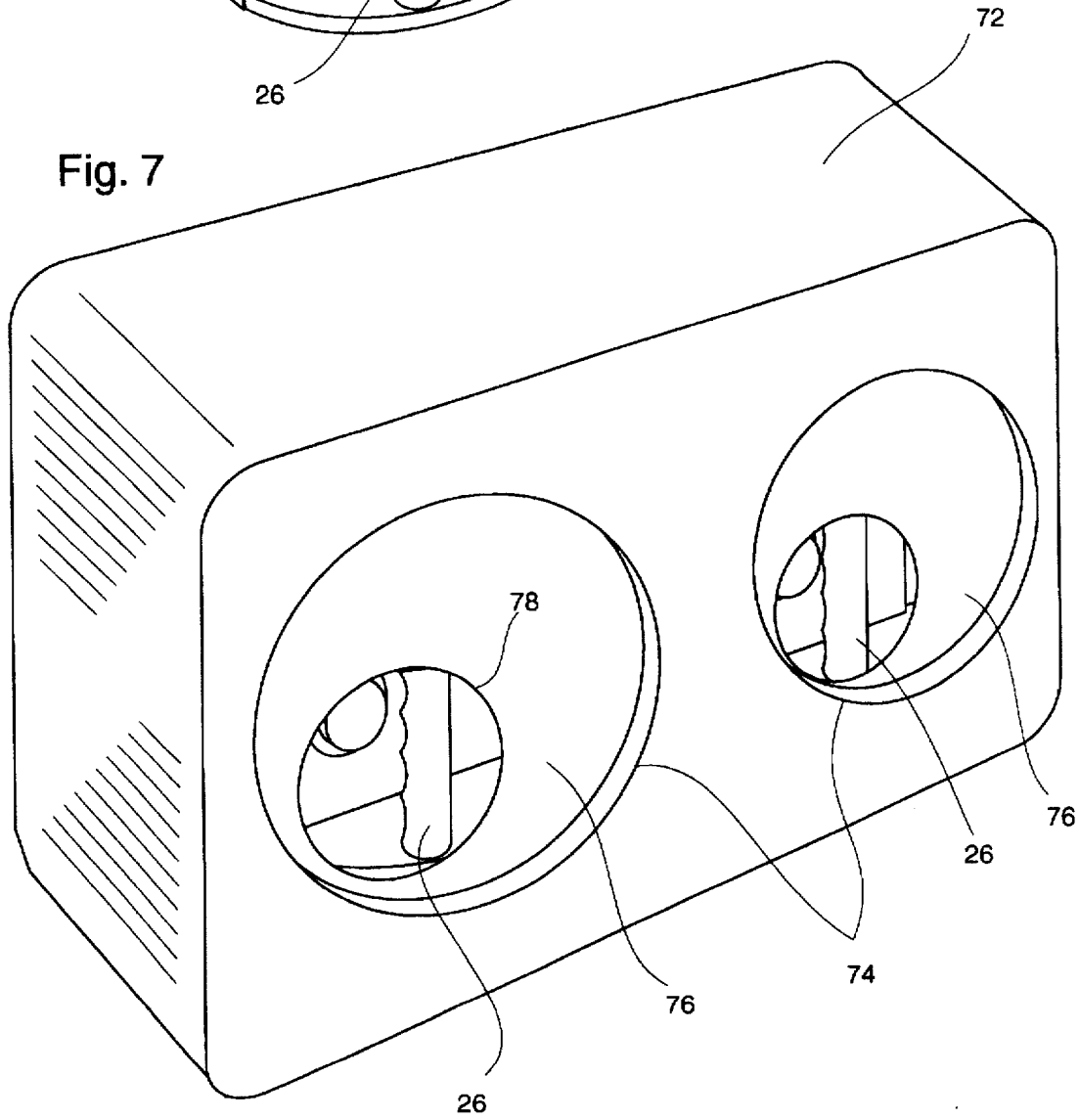
FIG. 7 is a perspective view of the present invention with a housing enclosing the same.
Figure 2:
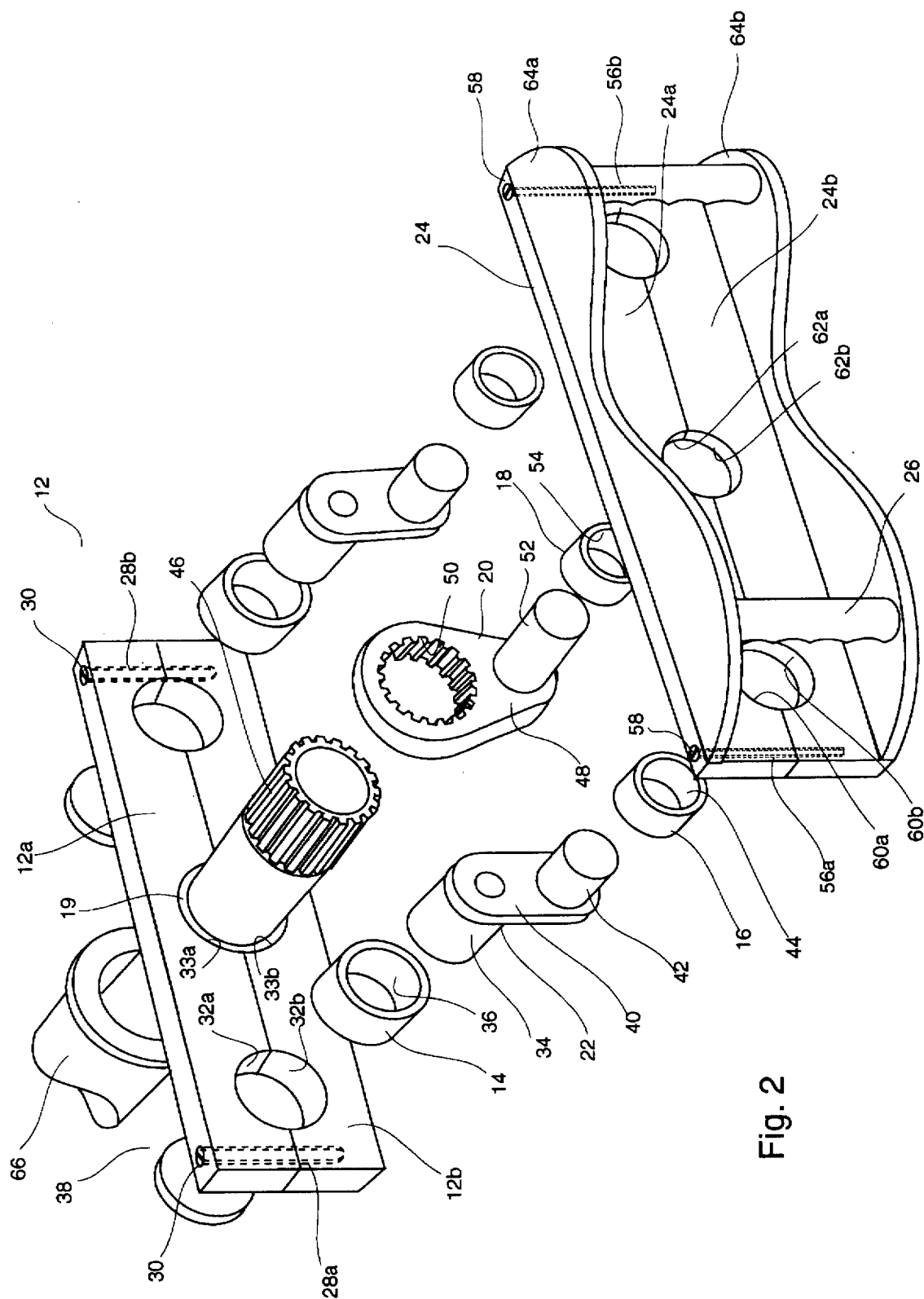
FIG. 2 is an exploded perspective view of the present invention.
Figure 8:
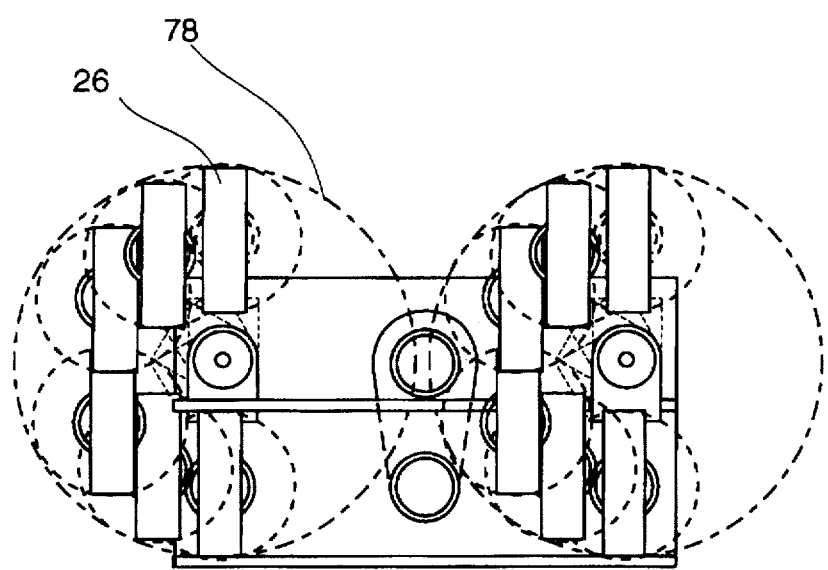
FIG. 8 is a view depicting the rotation of the handles of the steering mechanism.

FIG. 7 shows a housing 72 of the present invention. The housing 72 should be of a sufficient size and configuration to accommodate the rotation of the steering plate 24 and handles 26 therein. The housing 72 includes open surfaces 74 to permit access to and holding of handles 26 throughout the steering of the vehicle. The housing 72 provides not only a protective encasement for the other operative elements of the steering mechanism but also defines an area within which the steering plate 24 and handles 26 may freely move without risk of inadvertent obstruction by the user's or passenger's legs or arms. The housing 72 may also include additional apertures for venting purposes. Movable guard plates 76 having open surface 78 therein are disposed adjacent and between the steering plate 24 and housing 72 such that the handles 26 are exposed for access. FIG. 8 depicts the rotation of the handles 26. From the drawing shown in FIG. 8, it can be readily seen that the present invention provides a means for maintaining the handles 26 in a fixed non-rotating position with respect to one another.

The above described embodiment is set forth by way of example and is not for the purpose of limiting the present invention. It will be readily apparent to those skilled in the art that obvious modifications and variations can be made to the embodiment without departing from the scope of the invention. Accordingly, the claims appended hereto should be read in their full scope including any such modifications and variations.

What is claimed is:

1. A steering mechanism for a vehicle, which includes:

a steering shaft having a male splined end;

an elongated crank having a first female splined end operably matably splined to said splined end of said shaft;

a steering plate rotatably connected to a second end of said crank and having a pair of laterally displaced handle grips connected thereto, such that said plate is rotatable about said steering shaft causing said shaft to rotate; and means for maintaining said handle grips in a fixed non rotating position with respect to one another when said plate is rotated about said shaft wherein said maintaining means includes at least one idler crank having a first end rotatably connectable the vehicle and a second end rotatably connected to said steering plate.

2. The steering mechanism of claim 1, wherein said handle grips are fixedly connected to said steering plate.

3. The steering mechanism of claim 1, wherein said maintaining means includes a mounting plate connectable to the vehicle disposed adjacent the steering shaft and includes at least one idler crank having a first end rotatably connected to said mounting plate and a second end rotatably connected to said steering plate.

4. The steering mechanism of claim 1, which further includes a housing disposed about said crank and said steering plate and having an open surface through which said handle grips can be operably accessed.

* * * * *